(12) United States Patent
Schütt et al.

(10) Patent No.: US 6,425,620 B1
(45) Date of Patent: Jul. 30, 2002

(54) ROOF ARRANGEMENT FOR A CONVERTIBLE

(75) Inventors: Thomas Schütt, Fürstenfeldbruck; Stefan Miklosi, Munich, both of (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 09/615,076

(22) Filed: Jul. 12, 2000

(30) Foreign Application Priority Data

Jul. 12, 1999 (DE) .......................... 199 32 503

(51) Int. Cl.[7] .................................. B60J 7/00
(52) U.S. Cl. .................. 296/107.07; 296/146.14
(58) Field of Search ................ 296/146.14, 107.08, 296/107.07, 147

(56) References Cited

U.S. PATENT DOCUMENTS

| | | | | |
|---|---|---|---|---|
| 3,536,354 A | * | 10/1970 | Ingram | |
| 4,693,509 A | * | 9/1987 | Moy et al. | |
| 5,542,735 A | * | 8/1996 | Fürst et al. | |
| 5,823,606 A | * | 10/1998 | Schenk et al. | |
| 6,039,383 A | * | 3/2000 | Jambor et al. | |
| 6,142,555 A | * | 11/2000 | Huber | |
| 6,145,915 A | * | 11/2000 | Queveau et al. | |

FOREIGN PATENT DOCUMENTS

| | | |
|---|---|---|
| DE | 197 53 209 | 2/1999 |
| DE | 197 51 660 | 3/1999 |
| DE | 197 52 068 | 5/1999 |
| GB | 2 331 779 | 6/1999 |

* cited by examiner

Primary Examiner—Stephen T. Gordon
Assistant Examiner—Scott Carpenter
(74) Attorney, Agent, or Firm—Nixon Peabody LLP; David S. Safran

(57) ABSTRACT

Roof arrangement for a convertible with a rigid roof element (3), a rigid rear element (5) which has a rear window (31), a stowage space (16) for the folding roof located in the rear area of the vehicle for holding the roof arrangement (1), and a forced control mechanism (14) for opening and closing the roof arrangement (1), the rear element (5) having a U-shaped frame (23) with a rear lower cross strut (25) and two lateral C columns (29) and the rear window (31) with its rear lower edge being pivotally connected via the window pivot axis (33) to the bottom cross strut (25) of the rear element (5).

10 Claims, 3 Drawing Sheets

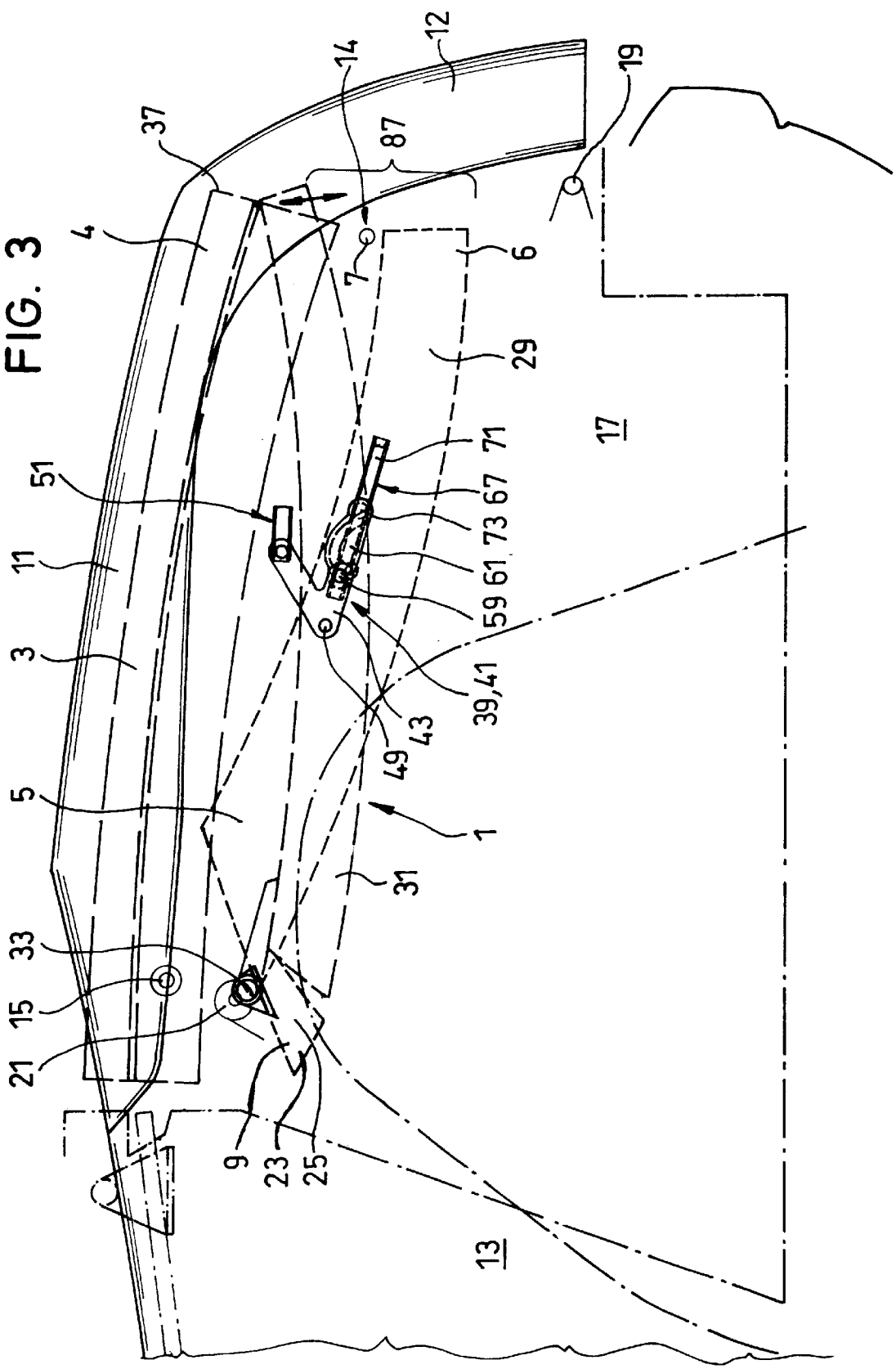

ROOF ARRANGEMENT FOR A CONVERTIBLE

BACKGROUND OF THE INVENTION

1. Field of the Invention

The invention relates to a roof arrangement for a convertible with a rigid roof element and a rigid rear element which has a rear window.

2. Description of Related Art

DE 197 51 660 C1 shows a motor vehicle with a roof structure in which a rigid roof part and two rear columns (C columns), which are located laterally to a solid rear window, can be folded together via a forced control mounted on the body and stowed in the rear area. The rear window is connected via a lever to the respective C column on a middle lateral section. The C column together with a main rod which connects the roof elements to the body represents multi-joint forced control. Between the lever which bears the rear window and the main rod, a forced guide lever is articulated. When the roof arrangement is swung to the rear into a rear stowage compartment for the folding top, the inside of the roof element is folded against the bottom of the C column, the rear window being pivoted via the restricted guide lever and the lever which bears the rear window to underneath the roof element such that the arch of the roof element is identical to the arch of the rear window.

The arch in the same direction between the roof element and the rear window enables space-saving accommodation of the folded-together roof structure in the stowage space. The forced control mechanism necessary for this purpose is however very complex. Furthermore, the rear window is held simply on a middle section laterally via the two levers so that the construction must be designed to be very durable and thus heavy so that the rear window, especially with the roof structure closed, can be held sealed in the intended position. Since the rear window is swung only in conjunction with the motion of the entire roof structure, the arrangement is not flexible.

SUMMARY OF THE INVENTION

Therefore, a primary object of this invention is to devise a convertible with a rigid roof element and a rigid rear element of the initially mentioned type in which the roof arrangement is multi-functional and the folded-together roof structure requires little stowage space in the folded-together state.

This object is achieved by a roof arrangement for a convertible with a rigid roof element and a rigid rear element which has a rear window and a stowage space for the folding roof located in the rear area of the vehicle for holding the roof arrangement, and a forced control mechanism for opening and closing the roof arrangement, by the rear element having a U-shaped frame with a rear lower cross strut and two lateral C columns, the rear window with its rear lower edge being pivotally connected via the window pivot axis to the bottom cross strut of the rear element.

When the roof arrangement is closed, it is possible to swing the upper transverse edge of the rear window around the pivot axis of the window into the interior of the motor vehicle and to form a gap between the rear transverse edge of the roof element and the top transverse edge of the rear window so that the passenger compartment can be ventilated easily and without a draft.

When the roof arrangement is folded together, preferably the concave side of the roof element being opposite the concave side of the rear window element and housed in a rear stowage space which can also be used as a trunk at the same time, the large amount of space required by the components which are opposite one another with their concave sides can be greatly reduced by the rear window which is held in the U-shaped frame being pivoted around the window pivot axis towards the roof element. In this way, a simple and uncomplicated mechanism can be used for the forced control for opening and closing the roof arrangement. Furthermore, by pivoting the rear window, the amount of space required by the folded-together roof arrangement can be reduced. If this arrangement is used in a stowage space for the folding roof, which space can also be used as a trunk at the same time, the access for loading and unloading the trunk can be greatly increased since the disruptive rear window is pivoted.

Advantageously the pivoting motion of the rear window can be independent of the opening motion of the roof structure when the rear window is pivoted with the roof arrangement closed in order to support ventilation of the interior. When the roof arrangement is opened, the pivoting movement of the rear window can take place in synchronization with the opening motion of the roof arrangement.

The above described roof arrangement is therefore a multi-functional solution which requires little stowage space in the folded-together state.

In a preferred embodiment, there is a seal which is pointed radially inward and which runs around the U-shaped frame; the rear window with its outer surface is pushed against it, when the rear window is closed. The pressure can be applied advantageously with a toggle lever mechanism which is located between the C column and the lateral end section of the rear window. With the toggle lever mechanism both the closed position and also different pivot positions of the rear window can be reliably assumed.

These and further objects, features and advantages of the present invention will become apparent from the following description when taken in connection with the accompanying drawings which, for purposes of illustration only, shows a single embodiment in accordance with the present invention.

BRIEF DESCRIPTION OF THE DRAWINGS

FIG. 2 is a side view of the rear area of a convertible according to FIG. 1 but with the rear window pivoted in; and FIG. 3 shows a side view of the rear area of a convertible with the roof structure opened and the rear window pivoted under.

DETAILED DESCRIPTION OF THE INVENTION

Figure 1:
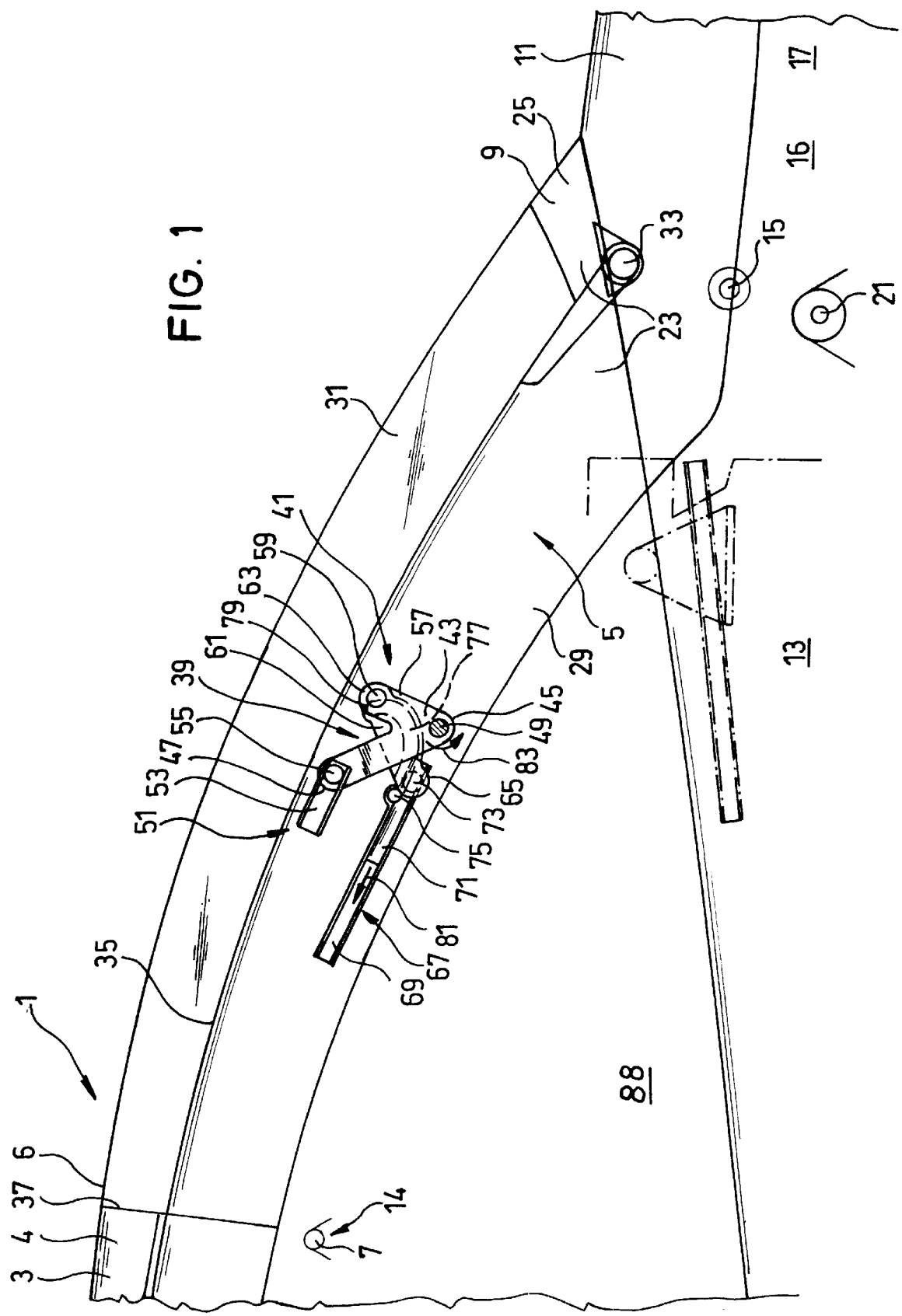
FIG. 1 is a side view of the rear area of a convertible with a closed roof arrangement and a rear window has not been pivoted.
Figure 2:
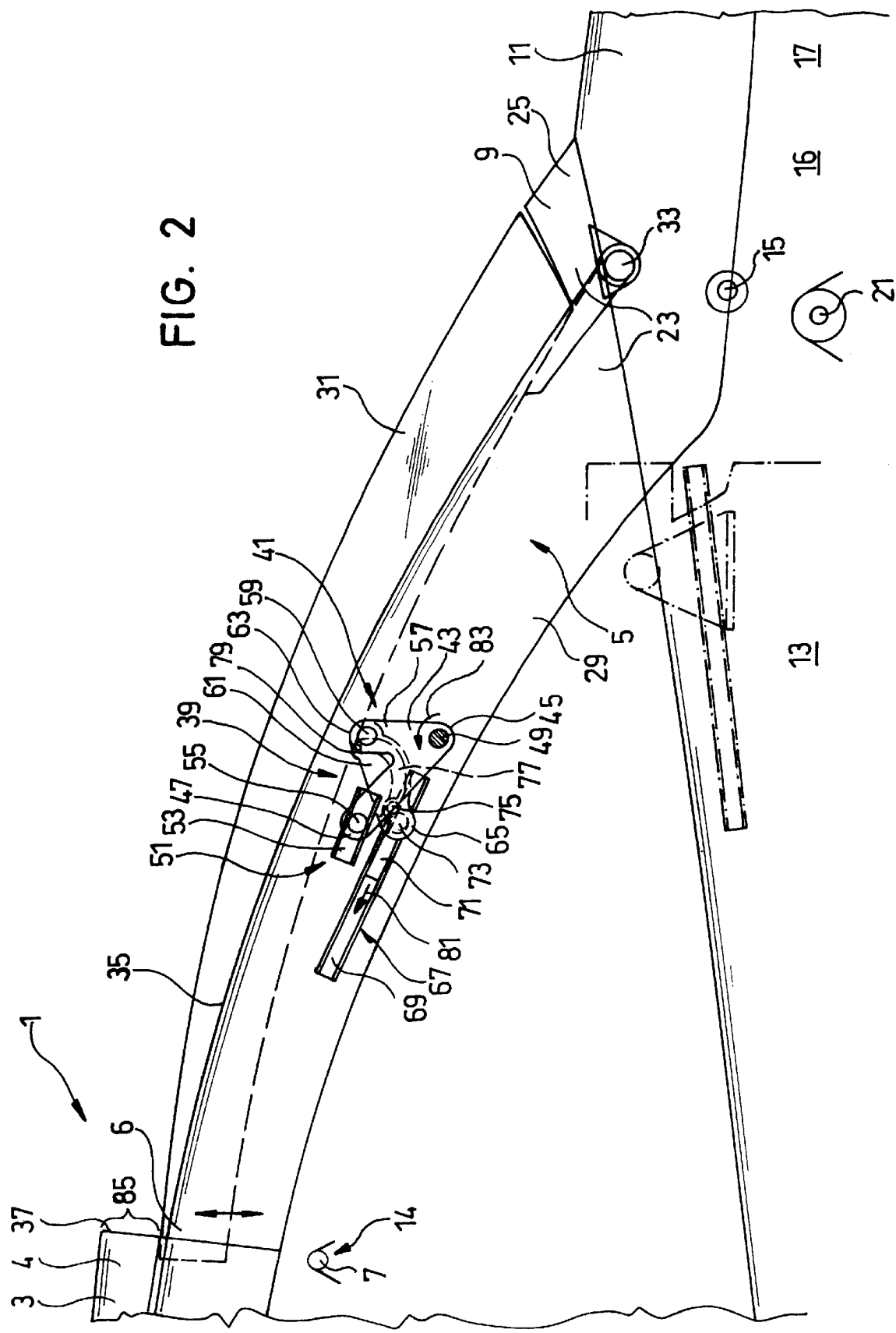

Each of FIGS. 1 to 3 show an extract of the rear area of a convertible in a side view, in the figures the front end being located on the left and the back end of the motor vehicle being located on the right.

In FIG. 1, the vehicle has a roof arrangement 1 which is made as a folding roof, comprising a rigid roof element 3 which is arranged essentially horizontally in the closed state (FIG. 1) and which is detachably connected to the upper transverse edge of a windshield (not shown), and a rigid rear element 5 which is arranged sloping obliquely downward to the rear and which is coupled to the roof element 3 via an upper pivot axis 7 adjacent to the rear end section of the roof element 3 and to the top end section 6 of rear element 5. This roof arrangement 1 is coupled adjacent to a lower end section 9 of the rear element 5 of the body 13 via a rear pivot axis 15. The roof arrangement 1 can be transferred from a closed state (FIG. 1 or 2) into an opened state (FIG. 3) via a forced control mechanism 14 (shown only schematically).

The rear lower end section 9 of the rear element 5 is adjoined by an essentially horizontally arranged tailgate 11 which has a vertical section 12 on the back end of the vehicle (see FIG. 3). The tailgate 11 can be pivoted up and down around a rear axis of rotation 19 (shown only schematically in FIG. 3) in order to enable folding and stowage of the roof structure 1 in a stowage space underneath the tailgate 11 for the folding roof and the tailgate 11 can be pivoted forward and up around the front axis of rotation 21 (shown only schematically) in order to make the stowage space which can also be used as a trunk 17 accessible for loading.

The rear element has a U-shaped frame 23 with a cross strut 25 which is located in the lower rear end section 9 of the rear element 5 and with C columns 29 which extend forward to the top and which are located each laterally on the cross strut 25. A solid rear window 31 is held by a U-shaped frame 23 and is coupled to the cross strut 25 via the window pivot axis 33 which runs parallel to the cross strut 25. On the outside surface of the U-shaped frame 23, there is a peripheral seal 35 which extends radially to the inside (shown only schematically), against which the edge area of the outside surface of the rear window 31 is sealed. On the rear end section of the roof element there is an upper seal 37 which runs transversely and which extends radially to the U-shaped recess of the U-shaped frame (shown only schematically) against which the outside surface of the upper edge area of the rear window lies.

On each side, between the middle section of the side edge of the rear window 31 and the C column 29, there is a movement mechanism 39 with which the rear window 31 can be pivoted around the pivot axis 33 of the window, preferably towards the passenger compartment 88. With the movement mechanism 39 the rear window 31, on the one hand, can be pressed against the peripheral seals 35 and the upper seal 37 in the closed state of the rear window 31 or it can be selectively moved into various opening positions (see also FIGS. 2 and 3) and can be kept in these positions. In doing so, the movement mechanism 39 can be selectively activated regardless of the forced control mechanism 14 for opening and closing of the roof arrangement I or depending on or in synchronization with the forced control mechanism 14.

In this embodiment, there is a toggle lever mechanism 41 between the rear window 31 and the C column 29 as the movement mechanism. The toggle lever mechanism 41 is explained below using FIG. 1 in the position in which the rear window 31 is closed. An actuation lever 43 is supported with one end side 45 via a first hinge 49 in the C column 29 and is connected to its other end side 47 via a first linear guide 51 to the rear window 31. The first linear guide 51 has a first guideway 53 which is attached to the rear window 31, which runs essentially parallel to the extension of the rear window 31, and in which a round pin 55 is guided to be able to turn and to be able to move lengthwise. The pin 55 is connected to the other end 47 of the actuating lever 43. The actuating lever 43, proceeding from its one end 45, has an extension 57 which is arranged at an angle and on which there is a second hinge 59. The first hinge 49, the pin 55 and the second hinge 59 form roughly an equilateral triangle. A control lever 61 is connected by an end 63, via the second hinge 59, to the actuating lever 43 and its other end 65, via a second linear guide 67, is attached to the C column. The second linear guide 67 has a second guideway 69 which is located roughly parallel to the first linear guide 51 and in which a slide element 71 is guided which in turn is connected via a third hinge 73 to the other end side 65 of the control lever 61. On the top side of the second guideway 69, adjacent to the third hinge 73 (in the position as shown in FIG. 1) there is a guide pin 75. The control lever 61 is provided with a curved crank path 77 which engages the guide pin 75 when the slide element 71 is moved along the second guideway 69. The curvature of the crank path 77 corresponds to the path of the guide pin 75 when the toggle lever mechanism 41 moves and additionally supports the control lever 61. The top end of the crank path 77 is used as an end stop 79.

In the position which is shown in FIG. 1, the first hinge 49 is located roughly in a linear continuation of the second guideway 69 obliquely underneath the second guideway 69. The second hinge 59 is located roughly perpendicular to the extension of the second guideway 69 above the first hinge 49 and in a linear continuation of the first guideway 53. Obliquely above the third hinge 73 the guide pin 75 is positioned in the first guideway 53. The slide element 71 is driven via a flexible spiral which is guided in a jacket (not shown) and is moved back and forth along the second guideway.

Instead of driving the actuating lever 43 via the control lever 61 and the second linear guide 67, the actuating lever 43 can be actuated directly via a worm gear pair (not shown) with a gear which is attached to the actuating lever 43 and a motorized worm wheel.

Instead of providing the toggle lever mechanism 41 as the movement mechanism 39, for example, a lifting spindle mechanism or a hydraulic cylinder can also be located between the rear window and the C column.

The motion of the toggle lever mechanism 41 is described below in a first function with the roof arrangement closed, proceeding from the position shown in FIG. 1, into the position shown in FIG. 2 with the roof arrangement 1 likewise closed, but the rear window 31 pivoted for ventilation purposes. To do this, the slide element 71, proceeding from the end position which is shown in FIG. 1 and in which the rear window is closed and is pressed against the peripheral seal 35 and the upper seal 37, is moved in the direction of the arrow 81. The actuating lever is moved in the direction of the arrow 83, the pin 55 being moved along the first guideway. In this motion sequence the guide pin 75 engages the guide path 77 in order to support the forces which arise. The rear window at this point turns around the pivot axis 33 of the window and opens a gap 85 (FIG. 2) which runs crosswise between the rear end section 4 of the roof element 3 and the top end section of the rear window 31. At this point, the interior of the convertible can be vented via the gap 85 with the roof arrangement 1 closed. The closing process of the rear window 31 takes place in the reverse sequence.

In a second function, the pivoting of the rear window 31 via the toggle lever mechanism in coordination with the opening motion of the roof arrangement 1 is described. To do this, first the rear window 31, as described above, is pivoted from the position shown in FIG. 1 into an intermediate position as shown in FIG. 2. The tailgate 11 is pivoted up to the rear around the rear axis of rotation 19 in order to make accessible the storage space 16 for the folding roof Then, the roof arrangement 1 is folded together via the forced control mechanism 14 such that the roof element 3 is folded with its concave inside against the concave inside of the rear element 5 and the rear element 5 is pivoted around the rear pivot axis 15 to the rear into the opened box 16 for the folding roof. In this position, the rear window 31 is pivoted further via the movement mechanism 39 around the pivot axis 33 of the window until the slide element 71 has reached its second end position which is shown in FIG. 3. The top end section of the rear window 31 then adjoins the back end section 4 of the roof elements 3 which are in the folded-together state. The tailgate is pivoted again around the rear axis 19 of rotation until the storage space 16 for the folding roof is closed. The closing process of the roof arrangement 1 takes place in the reverse sequence.

If, in this state, the tailgate 11 is pivoted around the front axis 21 of rotation upward and forward, the stowage space 17 which is now reduced in size by accommodation of the folded-together roof structure 1 becomes accessible via a loading gap 87 for loading of the remaining stowage space 17 (FIG. 3). This loading gap 87 has been greatly enlarged by pivoting the rear window 31 around the pivot axis 33 of the window.

While a single embodiment in accordance with the present invention has been shown and described, it is understood that the invention is not limited thereto, and is susceptible to numerous changes and modifications as known to those skilled in the art. Therefore, this invention is not limited to the details shown and described herein, and includes all such changes and modifications as are encompassed by the scope of the appended claims.

What is claimed is:

1. Roof arrangement for a convertible comprising a rigid roof element, a rigid rear element which has a rear window, said roof element being connect to said rear element in a manner enabling said elements to be folded together, a stowage space in a rear area of the vehicle for holding the roof arrangement when the roof element and rear element are folded together, and a forced control mechanism for opening closing the roof arrangement; wherein the rear element has a U-shaped frame with a rear lower cross strut, two lateral C columns, and the rear window; and wherein a rear lower edge of the rear window is pivotally connected via a window pivot axis to the bottom cross strut of the rear element, the rear window remaining essentially between the U-shaped frame of the rear element while being folded into the stowage space.

2. Roof arrangement as claimed in claim 1, wherein there is a movement mechanism which is independent of the forced control mechanism, said movement mechanism being provided between the U-shaped frame and the rear window for pivoting of the rear window.

3. Roof arrangement as claimed in claim 1, wherein a top end section of the rear element is coupled via a top pivot axis to a rear section of the roof element; and wherein a rear bottom section of the rear element is coupled via a rear pivot axis to the rear area of the body of the vehicle; wherein, when the roof arrangement is open, the roof element is folded with an inner side thereof against an inner side of the rear element, and the rear element is pivoted around the rear pivot axis to the rear into the stowage space.

4. Roof arrangement as claimed in claim 1, wherein the rear window is pivotable around the pivot axis of the window outwardly from a closed position, towards a passenger compartment of the vehicle when the roof arrangement is closed and towards the rear section of the roof element when the roof arrangement is folded together in the stowage space.

5. Roof arrangement as claimed in claim 2, wherein a seal is provided which projects radially inward and which runs around the U-shaped frame; wherein the pivot axis of the window is located on the cross strut parallel to the cross strut; and wherein an outer surface of the rear window adjoins the seal in the closed position of the rear window.

6. Roof arrangement as claimed in claim 5, wherein the movement mechanism has a toggle lever mechanism with which the rear window can be held in the closed position and can be pressed against the seal which runs around the U-shaped frame.

7. Roof arrangement as claimed in claim 6, wherein the toggle lever mechanism is provided with:

an actuating lever which is supported at one end via a first hinge in a C column and at an opposite end is connected via a first linear guide to the rear window; and a control lever which is connected at one end via a second hinge to a middle section of the actuating lever and is connected to the C column at an opposite end via a second linear guide which is located roughly parallel to the first linear guide.

8. Roof arrangement as claimed in claim 1, wherein the stowage space for the folding roof is formed by part of a vehicle trunk and a tailgate which covers the trunk is pivotable upward and to the rear around a rear axis of rotation located on the rear end section of the body in order to enable accommodation of the folded-together roof structure.

9. Roof arrangement for a convertible comprising a rigid roof element, a rigid rear element which has a rear window, said roof element being connect to said rear element in a manner enabling said elements to be folded together, a stowage space in a rear area of the vehicle for holding the roof arrangement when the roof element and rear element are folded together, and a forced control mechanism for opening and closing the roof arrangement; wherein the rear element has a U-shaped frame with a rear lower cross strut, two lateral C columns, and the rear window; and wherein a rear lower edge of the rear window is pivotally connected via a window pivot axis to the bottom cross strut of the rear element, wherein there is a movement mechanism which is independent of the forced control mechanism, said movement mechanism being provided between the U-shaped frame and the rear window for pivoting of the rear window, a seal being provided which projects radially inward and which runs around the U-shaped frame; wherein the pivot axis of the window is located on the cross strut parallel to the cross strut; and wherein an outer surface of the rear window adjoins the seal in the closed position of the rear window, wherein the movement mechanism has a toggle lever mechanism with which the rear window can be held in the closed position and can be pressed against the seal which runs around the U-shaped frame.

10. Roof arrangement as claimed in claim 9, wherein the toggle lever mechanism is provided with:

an actuating lever which is supported at one end via a first hinge in a C column and at an opposite end is connected via a first linear guide to the rear window; and a control lever which is connected at one end via a second hinge to a middle section of the actuating lever and is connected to the C column at an opposite end via a second linear guide which is located roughly parallel to the first linear guide.

* * * * *